(12) United States Patent
Loehr et al.

(10) Patent No.: US 11,395,194 B2
(45) Date of Patent: *Jul. 19, 2022

(54) INDICATING STATUS OF FORWARDED DATA

(71) Applicant: Motorola Mobility LLC, Chicago, IL (US)

(72) Inventors: Joachim Loehr, Wiesbaden (DE); Prateek Basu Mallick, Dreieich (DE); Ravi Kuchibhotla, Clarendon Hills, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/712,558

(22) Filed: Dec. 12, 2019

(65) Prior Publication Data

US 2020/0120554 A1 Apr. 16, 2020

Related U.S. Application Data

(63) Continuation of application No. 15/497,651, filed on Apr. 26, 2017, now Pat. No. 10,512,004.

(51) Int. Cl.
*H04W 36/00* (2009.01)
*H04W 36/36* (2009.01)
(Continued)

(52) U.S. Cl.
CPC ....... *H04W 36/0033* (2013.01); *H04L 1/1614* (2013.01); *H04W 36/023* (2013.01);
(Continued)

(58) Field of Classification Search
CPC .. H04W 36/02; H04W 36/023; H04W 36/026
See application file for complete search history.

(56) References Cited

U.S. PATENT DOCUMENTS

2008/0254800 A1 10/2008 Chun et al.
2011/0013593 A1* 1/2011 Hapsari ................ H04W 36/02
370/331
(Continued)

OTHER PUBLICATIONS

PCT/US2018/029614, "Notification of Transmittal of the International Search Report and the Written Opinion of the International Searching Authority, or the Declaration", International Searching Authority, dated Jul. 30, 2018, pp. 1-15.
(Continued)

*Primary Examiner* — Pao Sinkantarakorn
(74) *Attorney, Agent, or Firm* — Kunzler Bean & Adamson (57) ABSTRACT

Apparatuses, methods, and systems are disclosed for indicating data status to a target base unit. One apparatus includes a transceiver that communicates with a remote unit and a processor that determines to perform a conditional handover of the remote unit to a target base unit. The processor sends a conditional handover command to the remote unit, the conditional handover command including at least one condition the remote unit is to monitor for fulfillment prior to handing over to the target base unit. The processor receives uplink data from the remote unit after sending the conditional handover command and forwards the uplink data to the target base unit. The processor also sends an end marker to the target base unit in response to completing the forwarding of the uplink data.

20 Claims, 6 Drawing Sheets

(51) Int. Cl.
*H04W 36/16* (2009.01)
*H04W 36/02* (2009.01)
*H04L 1/16* (2006.01)
*H04L 1/00* (2006.01)
*H04W 92/20* (2009.01)

(52) U.S. Cl.
CPC ......... *H04W 36/165* (2013.01); *H04W 36/36* (2013.01); *H04L 2001/0092* (2013.01); *H04W 36/0055* (2013.01); *H04W 92/20* (2013.01)

(56) References Cited

U.S. PATENT DOCUMENTS

| | | |
|---|---|---|
| 2015/0327130 A1 | 11/2015 | Park et al. |
| 2017/0332301 A1 | 11/2017 | Horn et al. |
| 2018/0279193 A1 | 9/2018 | Park et al. |
| 2019/0116536 A1* | 4/2019 | Xu ....................... H04W 36/18 |

OTHER PUBLICATIONS

Huawei, "Data forwarding with QoS flow relocation", 3GPP TSG-RAN3 Meeting #95bis, R2-171072, Apr. 3-7, 2017, pp. 1-6.

Intel Corporation, "Discussion of solution 2: Maintaining source eNB connection during handover", 3GPP TSG-RAN WG2 Meeting #93bis, R2-162719, Apr. 11-15, 2016, pp. 1-6.

ZTE, ZTE Microelectronics, "Discussion on single connected handover", 3GPP TSG-RAN WG2 Meeting #97bis, R2-1702824, Apr. 3-7, 2017, pp. 1-6.

Huawei, "Flow based QoS during Handover", 3GPP TSG-RAN WG3 NR Ad-hoc, R3-170253, Jan. 17-19, 2017, pp. 1-4.

* cited by examiner

INDICATING STATUS OF FORWARDED DATA

CROSS-REFERENCE TO RELATED APPLICATIONS

This application claims priority to U.S. patent application Ser. No. 15/497,651 entitled "Indicating Status of Forwarded Data" and filed on Apr. 26, 2017 for Joachim Loehr, Prateek Basu Mallick, and Ravi Kuchibhotla, which application is incorporated herein by reference.

FIELD

The subject matter disclosed herein relates generally to wireless communications and more particularly relates to indicating status of transmitted data to a target base unit.

BACKGROUND

The following abbreviations and acronyms are herewith defined, at least some of which are referred to within the following description.

Third Generation Partnership Project ("3GPP"), Positive-Acknowledgment ("ACK"), Acknowledgment Mode ("AM"), Access and Mobility Management Function ("AMF"), Control Channel Element ("CCE"), Control Plane Function ("CPF"), Channel State Information ("CSI"), Common Search Space ("CSS"), Data Radio Bearer ("DRB"), Downlink ("DL"), Evolved Node B ("eNB"), European Telecommunications Standards Institute ("ETSI"), Frequency Division Duplex ("FDD"), Frequency Division Multiple Access ("FDMA"), Hybrid Automatic Repeat Request ("HARQ"), Information Element ("IE"), Long Term Evolution ("LTE"), LTA Advanced ("LTE-A"), Medium Access Control ("MAC"), Modulation Coding Scheme ("MCS"), Multiple Input Multiple Output ("MIMO"), Multipath TCP ("MPTCP"), Narrowband ("NB"), Negative-Acknowledgment ("NACK") or ("NAK"), Network Function ("NF"), Next Generation Node B ("gNB"), Orthogonal Frequency Division Multiplexing ("OFDM"), Physical Broadcast Channel ("PBCH"), Packet Data Convergence Protocol ("PDCP"), Packet Data Unit ("PDU"), Physical Downlink Control Channel ("PDCCH"), Physical Downlink Shared Channel ("PDSCH"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Link Control ("RLC"), Radio Resource Control ("RRC"), Random Access Procedure ("RACH"), Random Access Response ("RAR"), Radio Bearer ("RB"), Receive ("RX"), Service Data Unit ("SDU"), Switching/Splitting Function ("SSF"), Scheduling Request ("SR"), Session Management Function ("SMF"), Shared Channel ("SCH"), Signal-to-Interference-Plus-Noise Ratio ("SINR"), System Information Block ("SIB"), Transport Block ("TB"), Transport Block Size ("TBS"), Transmission Control Protocol ("TCP"), Time-Division Duplex ("TDD"), Time Division Multiplex ("TDM"), Transmission and Reception Point ("TRP"), Transmission Time Interval ("TTI"), Transmit ("TX"), Uplink Control Information ("UCI"), User Datagram Protocol ("UDP"), User Entity/Equipment (Mobile Terminal) ("UE"), Uplink ("UL"), User Plane Function ("UPF"), Universal Mobile Telecommunications System ("UMTS"), and Worldwide Interoperability for Microwave Access ("WiMAX"). As used herein, "HARQ-ACK" may represent collectively the Positive Acknowledge ("ACK") and the Negative Acknowledge ("NAK"). ACK means that a TB is correctly received while NAK means a TB is erroneously received.

In 5G networks, a source gNB (or other 5G base station) may handover a UE using a conditional handover to increase the reliability of the handover command and thus provide improved handover performance. After sending the conditional handover command, the source gNB forwards data to the target gNB and also attempts to deliver this data to the UE. However, the UE may spend some considerable amount of time in the source cell after receiving the conditional handover command, the UE being scheduled until it executes the handover (e.g., when the handover condition is fulfilled), leading to a large amount of data being forwarded to the target gNB. The target gNB is unaware which data was successfully transmitted in the source cell. Hence, the target gNB may unnecessarily retransmit a significant amount of data for the conditional handover case.

BRIEF SUMMARY

Methods for indicating status of transmitted data to a target base unit are disclosed. Apparatuses and systems also perform the functions of the methods. In one embodiment, a method of a base unit (e.g., a gNB) for indicating status of transmitted data to a target base unit includes determining to handover a served remote unit to a target base unit. The method includes forwarding data for the remote unit to the target base unit and transmitting the forwarded data to the remote unit. The method also includes sending a status message to the target base unit. Here, the status message indicates whether forwarded data was successfully transmitted to the remote unit.

In another embodiment, a method of a remote unit (e.g., a UE) for indicating status of transmitted data to a target base unit includes communicating with a mobile communication network via a base unit and receiving a conditional handover command from the base unit. Here, the conditional handover command indicates a target base unit and a condition for handover. The method includes receiving data from the base unit in response to the condition for handover not being met and connecting to the target base unit in response to the condition for handover being met. The method also includes transmitting a status report to the target base unit in response to connecting to the target base unit. Here, the status report identifies data successfully received from the base unit prior to connecting to the target base unit.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

In order to minimize unnecessary retransmission of user data by the target base unit (e.g., gNB, eNB, or other base station), the source base unit (e.g., gNB, eNB, or other base station) sends a status message to the target base unit after delivering downlink data to the UE. Here, the status message may be a downlink-specific status message containing sequence number ("SN") and deliver status information for the downlink data. In contrast to conventional handover where a SN status message is sent to the target gNB upon handover command transmission, the disclosed embodiments send one or more additional status messages to the target gNB after the handover command transmission (e.g., while the source gNB is continuing to serve the UE), thereby updating the target gNB with downlink status information.

As an example, the source gNB may sends a status message to the target gNB in response to receiving a RLC status report from the UE. As another example, the source gNB sends status messages on a periodic basis (e.g., according to a predefined or preconfigured interval). In yet another example, the source gNB sends a status message every time a predetermined amount of data (e.g., predetermined number of data units) is transmitted to the UE. In certain embodiments, the source gNB sends a final status message upon determining that the UE has completed handover to the target gNB.

In some embodiments, the downlink status message contains RLC and/or PDCP delivery status information. For example, the downlink status message may inform the target gNB about successfully transmitted PDCP SDUs that were also forwarded to the target gNB. Upon receiving confirmation that a PDCP SDU was successfully delivered, the target gNB may then forgo transmitting the corresponding PDCP SDU and instead delete it from the cache/buffer. In certain embodiments, the downlink status message includes a bitmap indicating the delivery status of the forwarded PDCP SDUs. Here, the SN of a first forwarded PDCP SDU may also be signaled.

For uplink data, the source gNB forwards correctly received uplink data to the target gNB. Using the sequence number associated with the uplink data, the target gNB build an uplink status report to send to the UE after it completes handover. The source gNB may also send an end marker to the target gNB indicating that the last uplink data unit was forwarded.

Figure 1:
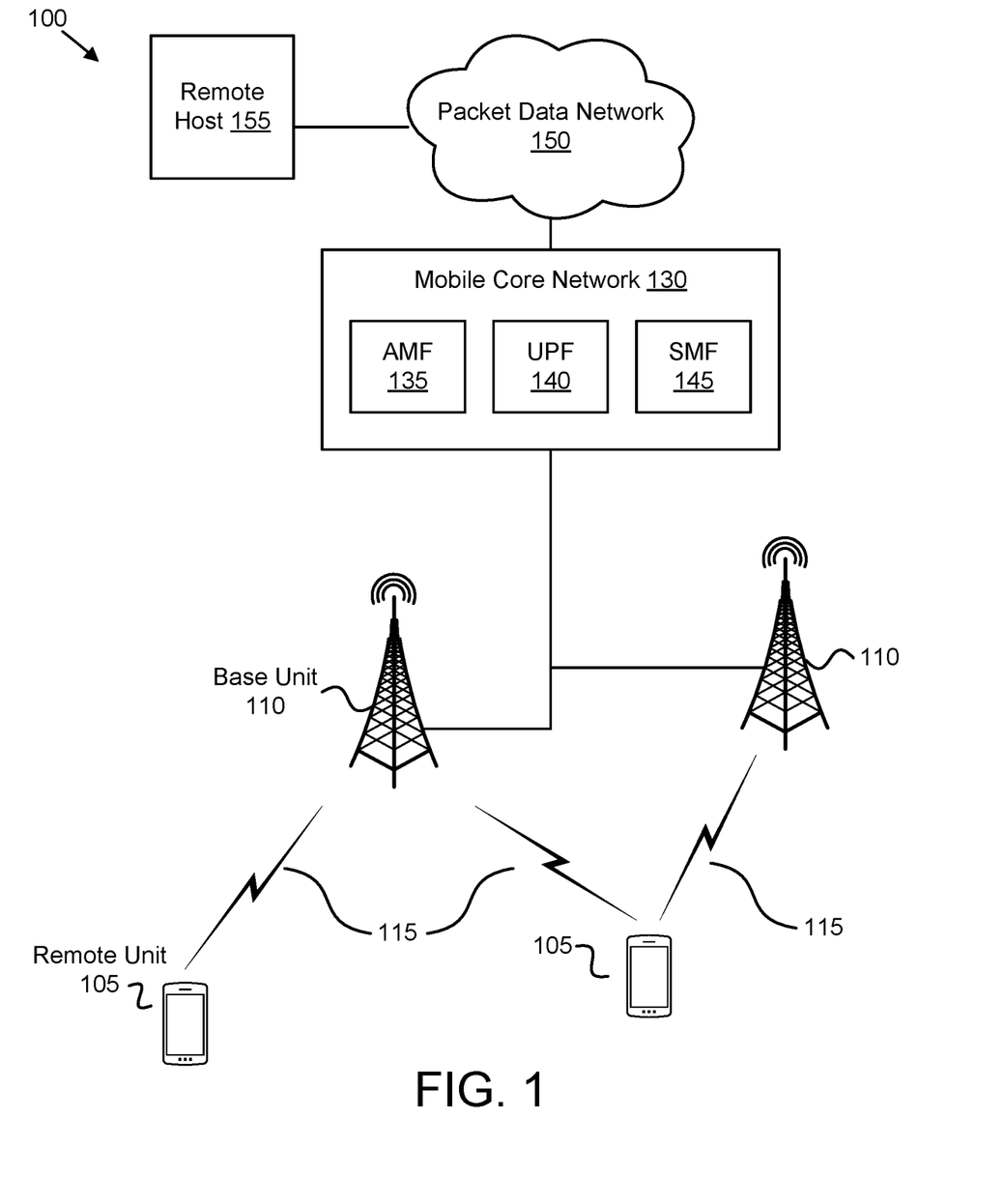
FIG. 1 is a schematic block diagram illustrating one embodiment of a wireless communication system for indicating status of transmitted data to a target base unit.

FIG. 1 depicts a wireless communication system 100 for indicating status of transmitted data to a target base unit, according to embodiments of the disclosure. In one embodiment, the wireless communication system 100 includes remote units 105, base units 110, and communication links 115. Even though a specific number of remote units 105, base units 110, and communication links 115 are depicted in FIG. 1, one of skill in the art will recognize that any number of remote units 105, base units 110, and communication links 115 may be included in the wireless communication system 100.

In one implementation, the wireless communication system 100 is compliant with the 5G system specified in the 3GPP specifications. More generally, however, the wireless communication system 100 may implement some other open or proprietary communication network, for example, LTE or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as subscriber units, mobiles, mobile devices, mobile stations, users, terminals, mobile terminals, fixed terminals, subscriber stations, UE, user terminals, a device, or by other terminology used in the art. The remote units 105 may communicate directly with one or more of the base units 110 via uplink ("UL") and downlink ("DL") communication signals. Furthermore, the UL and DL communication signals may be carried over the communication links 115.

In some embodiments, the remote units 105 communicate with a remote host 155 via a network connection with the mobile core network 130. For example, a remote unit 105 may establish a data session with the mobile core network 130 via a base unit 110. The mobile core network 130 then relays traffic between the remote unit 105 and the remote host 155 using the data session. At some point in time, the remote unit 105 may need to be handed over to another base unit 110 (e.g., due to mobility of the remote unit 105).

The base units 110 may be distributed over a geographic region. In certain embodiments, a base unit 110 may also be referred to as an access terminal, a base, a base station, a Node-B, an eNB, a gNB, a Home Node-B, a relay node, an access point, a device, or by any other terminology used in the art. The base units 110 are generally part of a radio access network ("RAN") that may include one or more controllers communicably coupled to one or more corresponding base units 110. These and other elements of radio access network are not illustrated but are well known generally by those having ordinary skill in the art. The base units 110 connect to the mobile core network 130 via the RAN. Additionally, a base unit 110 may be communicably coupled to one or more other base units 110. Here, the base units 110 may employ an "Xn" interface to forward data and send status messages at handover, as discussed in greater detail below.

The base units 110 may serve a number of remote units 105 within a serving area, for example, a cell or a cell sector via a wireless communication link. The base units 110 may communicate directly with one or more of the remote units 105 via communication signals. Generally, the base units 110 transmit downlink ("DL") communication signals to serve the remote units 105 in the time, frequency, and/or spatial domain. Furthermore, the DL communication signals may be carried over the communication links 115. The communication links 115 may be any suitable carrier in licensed or unlicensed radio spectrum. The communication links 115 facilitate communication between one or more of the remote units 105 and/or one or more of the base units 110.

In one embodiment, the mobile core network 130 is a 5G core ("5GC") or the evolved packet core ("EPC"), which may be coupled to a packet data network 150, like the Internet and private data networks, among other data networks. Each mobile core network 130 belongs to a single public land mobile network ("PLMN"). The present disclosure is not intended to be limited to the implementation of any particular wireless communication system architecture or protocol.

The mobile core network 130 includes several network functions ("NFs"). As depicted, the mobile core network 130 includes at least an Access and Mobility Management Function ("AMF") 135, a User Plane Function ("UPF") 140, and a Session Management Function ("SMF") 145. Although a specific number and specific types of NFs are depicted in FIG. 1, one of skill in the art will recognize that any number and/or type of NF may be included in the mobile core network 130.

The AMF 135 operates on a control plane of the mobile core network 130 and provide functionality such as NAS signaling termination, NAS signaling security, AS Security control, Inter CN node signaling (for mobility between 3GPP access networks), idle mode UE reachability (including control and execution of paging retransmission), tracking area list management (for UE in idle and active mode), AMF selection for handovers with AMF change, access authentication and authorization (including check of roaming rights), and the like.

The UPF 140 operates on a user plane of the mobile core network 130 and provides user plane (e.g., data) services to the remote units 105. For example, a data connection between the remote unit 105 and a remote host 155 is managed by a UPF 140. Examples of functionalities provided by the UPF 140 include: anchor point for Intra-/Inter-RAT mobility, external PDU session point of interconnect to the data network 150, packet routing and forwarding, packet inspection and policy rule enforcement (at the user plane level), traffic usage reporting, uplink classifier to support routing traffic flows to a data network, branching point to support multi-homed PDU session, QoS handling for user plane (e.g., packet filtering, gating, UL/DL rate enforcement), uplink traffic verification (e.g., service data flow ("SDF") to QoS flow mapping), transport level packet marking in the uplink and downlink, downlink packet buffering and downlink data notification triggering, and the like.

The SMF 145 operates on the control plane of the mobile core network 130 and manages data sessions for the remote unit 105. Examples of functionalities provided by the SMF 145 include session management, UE IP address allocation and management, selection and control of the UPF 140, traffic steering configuration at the UPF 140 (e.g., to route traffic to a proper destination), QoS and policy rule enforcement (at the control plane level), and downlink data notification.

As depicted, a remote unit 105 may be connected to a base unit 110 and may establish a data session with the remote host 155. At some point in time, the remote unit 105 may need to be handed over to another base unit 110, for example due to moving from a coverage area of one base unit 110 into the coverage area of the other base unit 110. In certain embodiments, the coverage areas of the base units 110 may have some overlap. The remote unit 105 sends measurement reports to its serving base unit 110 (e.g., in response to signal strength or quality indicators reaching a first ("low") threshold. Here, the serving base unit 110 begins a handover procedure due to the measurements reaching the first threshold. In one embodiment, the serving base unit 110 selects a target base unit 110 and requests early handover of the remote unit 105. In response to the target base unit 110 accepting the handover, the serving base unit 110 sends a conditional handover command that identifies the target base unit 110. The conditional handover command also contains a second ("high") threshold condition such that when the condition is met, then the remote unit 105 triggers handover (e.g., synchronization to target cell and random access) to the target base unit 110.

Additionally, the serving base unit 110 continues to schedule DL/UL data transmissions to the remote unit 105 upon sending the conditional handover command and continues to serve the remote unit 105 until the remote unit 105 connects to a target base unit 110. At the same time, the serving base unit 110 forwarding the data to the target base unit 110 to minimize service disruptions. As discussed above, the serving base unit 110 also sends status messages to the target base unit 110 informing it whether the DL data transmission were successfully sent. The serving base unit 110 also forwards UL data (and sequence number information) to the target base unit 110 so that the target base unit 110 is aware which UL data transmissions were successfully received. In this way, the serving base unit 110 updates the target base unit 110 with status information of successful data transmissions, thus minimizing unnecessary retransmission of user data by the target base unit 110. Here, the "Xn" interface between base units 110 may be used when forwarding the data and sending the status updates.

Figure 2A:
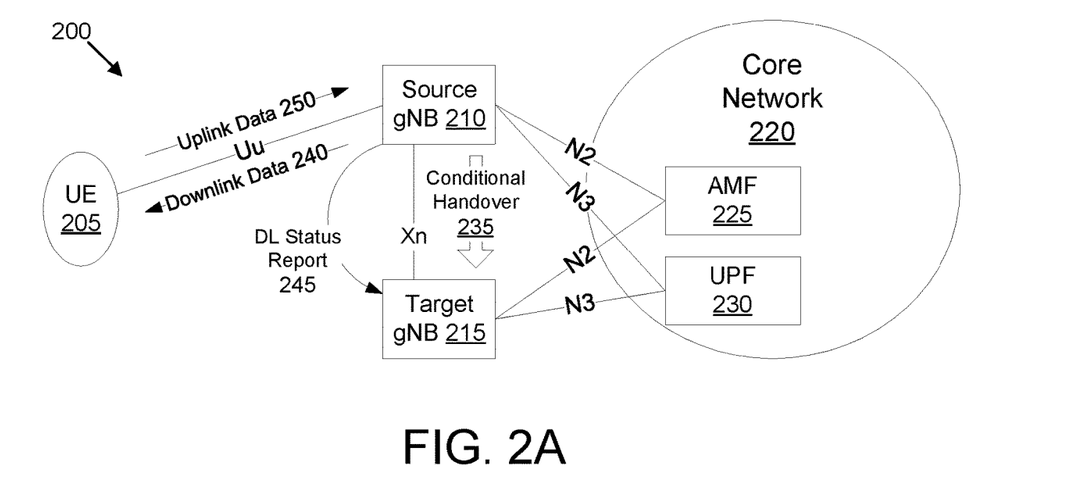
FIG. 2A is a block diagram illustrating one embodiment of a network architecture for indicating status of transmitted data to a target base unit prior to handover to the target.
Figure 2B:
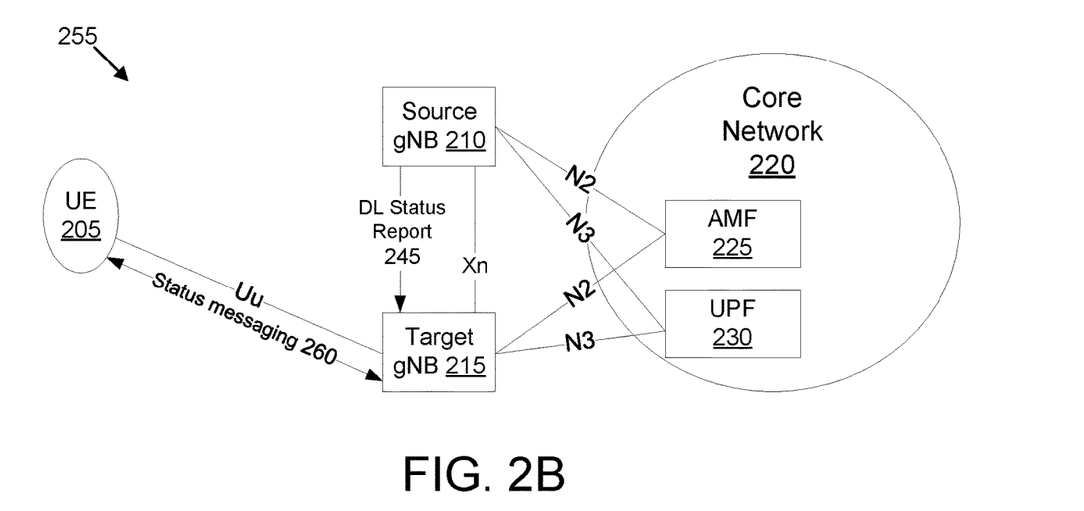
FIG. 2B is a block diagram illustrating one embodiment of a network architecture for indicating status of transmitted data to a target base unit after handover to the target.

FIGS. 2A-2B depict network architecture for indicating status of transmitted data to a target base unit. In particular, FIG. 2A depicts connections and messaging at a time when a conditional handover is initiated (note that the UE 205 may be served by the source gNB 210 for some considerable amount of time in the source cell after receiving the conditional handover command). FIG. 2B depicts connections and messaging at a time when the conditional handover is completed.

FIG. 2A depicts a network architecture 200 used for indicating status of transmitted data to a target base unit, according to embodiments of the disclosure. The network architecture 200 may be a simplified embodiment of the wireless communication system 100. As depicted, the network architecture 200 includes a UE 205 that communicates with a core network 220 via a source gNB 210. The UE 205 has connections to an AMF 225 and a UPF 230 in the core network 220 (via an "N2" interface and an "N3" interface, respectively). The source gNB 210 determines to handover the UE 205 to a target gNB 215 (which also uses "N2" and "N3" interfaces to communicate with the AMF 225 and UPF 230).

The UE 205 may be one embodiment of a remote unit 105 and the source gNB 210 may be one embodiment of a base unit 110, as described above. As depicted, the UE 205 communicates with the source gNB 210 over a "Uu" interface. As discussed above, the decision to initiate a conditional handover 235 is triggered by a measurement report from the UE 205 reaching a certain threshold. The source gNB 210 determines to handover the UE 205 to the target gNB 215 and begins to forward data to the target gNB 215. Here, the source gNB 210 transmits downlink data 240 to the UE 205 after initiating the conditional handover 235 and also forwards a copy of the downlink data 240 to the target gNB 215. As depicted, the source gNB 210 communicates with the target gNB 215 over an "Xn" interface. The target gNB 215 stores the downlink data 240 in a buffer for transmitting to the UE 205 in response to the UE 205 completing handover to the target gNB 215.

Additionally, the source gNB 210 transmits a DL status report 245 to the target gNB 215 indicating status information (e.g., RLC/PDCP status information) for the downlink data 240 (e.g., whether the downlink data 240 was successfully transmitted). By monitoring DL status reports 245, the target gNB 215 (upon the UE 205 completing handover) only retransmits the downlink data 240 that was not successfully transmitted by the source gNB 210. As used herein, "successfully transmitted" refers to data for which the UE 205 receives and can properly decode. In various embodiments, the UE 205 sends a positive acknowledgement ("ACK") for each data unit (e.g., packet, SDU, etc.) received and correctly decoded.

In some embodiments, the UE 205 transmits uplink data 250 to the source gNB 210 after receiving a conditional handover command but before completing handover to the target gNB 215 (e.g., due to a condition for handover not being met). Here, the source gNB 210 forwards received UL data to the target gNB 215 so that the target gNB 215 can compile a UL status report. In one embodiment, the source gNB 210 delivers the in-sequence received UL data units (e.g., PDCP SDUs) to the UPF 230 and forwards the out-of-sequence received UL data units (e.g., UL PDCP SDUs) to the target gNB 215 upon having sent to the HO command. Data units are determined to be in-sequence or out-of-sequence based on their sequence numbers. In another embodiment, the source gNB 210 forwards every correctly received UL data unit (e.g., PDCP SDU) to the target gNB 215. The target gNB 215 then generates a UL (PDCP) status report based on the forwarded uplink data 250 and sends the report to the UE 205 after handover.

FIG. 2B depicts a network architecture 255 used for indicating status of transmitted data to a target base unit, according to embodiments of the disclosure. The network elements in the network architecture 255 are the same as those in the network architecture 200; however, different connections exist in the network architecture 255. As depicted, the network architecture 255 shows the UE 205 after completing handover to the target gNB 215. The UE 205 has new connections to the AMF 225 and the UPF 230 with the target gNB 215. Here, the UE 205 communicates with the target gNB 215 over a "Uu" interface.

As depicted in FIG. 2B, the source gNB 210 sends a (final) DL status report 245 to the target gNB 215 upon the data transmission path being switched from the source gNB to the target gNB, e.g., downlink data transmission towards the UE 205 is no longer routed via the source gNB. By doing so, the target gNB 215 has the most accurate information as to whether the downlink data 240 was successfully delivered to the UE 205 by the source gNB 210. The target gNB 215 only retransmits those DL data units not successfully transmitted, thereby minimizing unnecessary retransmission of user data by the target gNB 215.

As discussed above, the target gNB 215 generates a UL (PDCP) status report based on the forwarded uplink data 250 and sends the report to the UE 205 after handover. However, because the source gNB 210 continues to forward correctly received data units (e.g., PDCP SDUs) after handover command, the target gNB 215 doesn't know when last data unit (PDCP SDU) has been forwarded. Therefore, in some embodiments, the source gNB 210 inserts an end marker towards the target gNB 215 upon determining that the forwarding is complete. Upon reception of the end marker, the target gNB 215 can generate the UL (PDCP) status report.

As depicted, the target gNB 215 and the UE 205 may communicate status messaging 260 after the UE 205 completes handover to the target gNB 215. In one embodiment, the status messaging 260 includes the target gNB 215 transmits the aforementioned UL status report to the UE 205, and the UE 205 retransmits uplink data 250 that was not successfully received by the source gNB 210. Additionally, in certain embodiments the status messaging 260 may include the UE 205 sending a PDCP status report to the target gNB 215 upon connecting to the target gNB 215. Here, the PDCP status report may contain status information for multiple DRBs. To avoid delay of the PDCP status report, the UE 205 may prioritize the PDCP status report when first connecting to the target gNB 215, regardless of a general priority of a logical channel used to send PDCP reports. For example, the UE 205 may override logical channel priority levels to ensure that a PDCP control PDU containing the PDCP status report is sent in the first uplink transmission to the target gNB 215.

In certain embodiments, the PDCP status report for all DRBs (e.g., acknowledgement mode ("AM") DRBs) could be transmitted together using a MAC control element or an RRC information element. In one embodiment, a new MAC control element and/or RRC information element may be defined which carries PDCP status of all the DRBs. The MAC control element or RRC information element carrying the PDCP status report may then be prioritized over other logical channel to ensure that the PDCP status report is delivered as soon as possible, thereby minimizing the interruption time.

Figure 3:
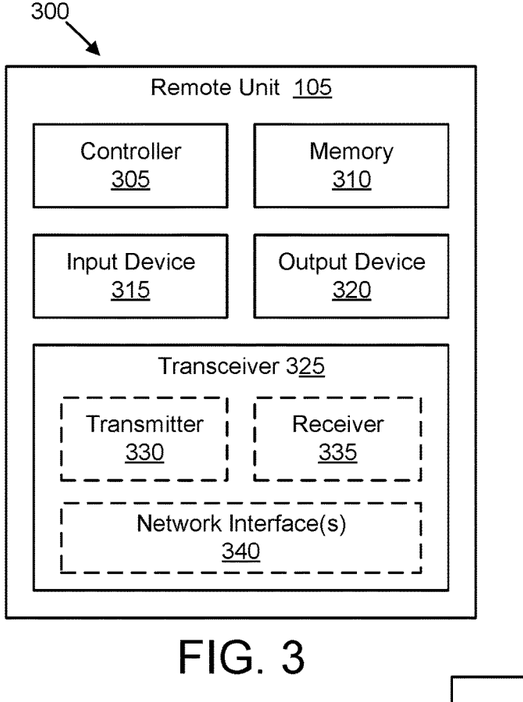
FIG. 3 is a schematic block diagram illustrating one embodiment of a remote apparatus for indicating status of transmitted data to a target base unit.

FIG. 3 depicts one embodiment of a remote apparatus 300 that may be used for indicating status of transmitted data to a target base unit, according to embodiments of the disclosure. The remote apparatus 300 includes one embodiment of the remote unit 105. Furthermore, the remote unit 105 may include a processor 305, a memory 310, an input device 315, a display 320, and a transceiver 325. In some embodiments, the input device 315 and the display 320 are combined into a single device, such as a touchscreen. In certain embodiments, the remote unit 105 may not include any input device 315 and/or display 320.

The transceiver 325 communicates with a mobile communication network (e.g., the mobile core network 130 and/or the core network 220) via a base unit 110 (e.g., via the source gNB 210 and/or the target gNB 215). The transceiver 325 may include at least one transmitter 330 and at least one receiver 335. Additionally, the transceiver 325 may support at least one network interface 340, such as an "Uu" interface used for communications between the remote unit 105 and the base unit 110, a "N2" interface used for communication with the AMF 225 (or AMF 135), and a "N3" interface used for communication with the UPF 230 (or UPF 140), or their equivalents.

The processor 305, in one embodiment, may include any known controller capable of executing computer-readable instructions and/or capable of performing logical operations. For example, the processor 305 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 305 executes instructions stored in the memory 310 to perform the methods and routines described herein. The processor 305 is communicatively coupled to the memory 310, the input device 315, the display 320, and first transceiver 325.

In some embodiments, the processor 305 receives a conditional handover command from a source base unit. Here, the conditional handover command indicates a target base unit and a condition for handover. The processor 305 may then monitor the condition for handover to determine whether it becomes satisfied. In certain embodiments, the processor 305 receives data from the source base unit in response to the condition for handover not being met. In certain embodiments, the processor 305 also transmits uplink data to the source base unit in response to the condition for handover not being met. Additionally, the processor 305 connects to the target base unit in response to the condition for handover being met.

In certain embodiments, the data received from the source base unit is also forwarded, by the source base unit, to the target base unit. Here, the source base unit also informs the target base unit whether the remote apparatus 300 successfully receives the data. As used herein, data is considered successfully received by the remote apparatus 300 when reception occurs and the processor 305 (or the transceiver 325) is able to decode (successfully) the received signal. The remote apparatus 300 indicates successful reception by sending a positive acknowledgement ("ACK") to the base unit. In one embodiment, the processor 305 sends a RLC status report message to the source base unit in response to receiving data from the source base unit, the RLC status report indicating (e.g., using sequence numbers) which PDUs were successfully received and which were lost (or uncorrectable).

In some embodiments, the processor 305 transmits a status report to the target base unit in response to connecting to the target base unit. In one embodiment, the status report identifies downlink data successfully received from the source base unit prior to connecting to the target base unit. In certain embodiments, the status report is a PDCP status report and the processor 305 transmitting the PDCP status report using a PDCP control PDU. In one embodiment, transmitting the PDCP status report includes transmitting the PDCP control PDU in a first uplink transmission to the target base unit.

In some embodiments, the status report includes a MAC control element, wherein transmitting the status report includes generating a status report indicating a PDCP status of one or more DRBs (for example, AM DRBs). In such embodiments, the MAC control element includes an identifier for each of the one or more DRBs. Here, the identifiers identify the DBRs for which a PDCP status is included in the status report. In certain embodiments, the status report includes a RRC information element, wherein transmitting the status report includes generating a status report indicating a downlink PDCP status of one or more DRBs.

In certain embodiments, the processor 305 further receives an uplink status report from the target base unit in response to connecting to the target base unit. Here, the uplink status report identifying uplink data successfully received at the base unit prior to connecting to the target base unit. From the uplink status report, the processor 305 may identify one or more uplink PDCP SDUs unsuccessfully received at the source base unit and retransmit the one or more unsuccessfully received uplink PDCP SDUs to the target base unit.

The memory 310, in one embodiment, is a computer readable storage medium. In some embodiments, the memory 310 includes volatile computer storage media. For example, the memory 310 may include a RAM, including dynamic RAM ("DRAM"), synchronous dynamic RAM ("SDRAM"), and/or static RAM ("SRAM"). In some embodiments, the memory 310 includes non-volatile computer storage media. For example, the memory 310 may include a hard disk drive, a flash memory, or any other suitable non-volatile computer storage device. In some embodiments, the memory 310 includes both volatile and non-volatile computer storage media. In some embodiments, the memory 310 stores data relating to indicating status of transmitted data to a target base unit, for example user data, network addresses, conditions for handover, radio quality measurements, protocol stacks, and the like. In some embodiments, the memory 310 also stores program code and related data, such as an operating system or other controller algorithms operating on the remote unit 105 and one or more software applications.

The input device 315, in one embodiment, may include any known computer input device including a touch panel, a button, a keyboard, a stylus, a microphone, or the like. In some embodiments, the input device 315 may be integrated with the display 320, for example, as a touchscreen or similar touch-sensitive display. In some embodiments, the input device 315 includes a touchscreen such that text may be input using a virtual keyboard displayed on the touchscreen and/or by handwriting on the touchscreen. In some embodiments, the input device 315 includes two or more different devices, such as a keyboard and a touch panel.

The display 320, in one embodiment, may include any known electronically controllable display or display device. The display 320 may be designed to output visual, audible, and/or haptic signals. In some embodiments, the display 320 includes an electronic display capable of outputting visual data to a user. For example, the display 320 may include, but is not limited to, an LCD display, an LED display, an OLED display, a projector, or similar display device capable of outputting images, text, or the like to a user. As another, non-limiting, example, the display 320 may include a wearable display such as a smart watch, smart glasses, a heads-up display, or the like. Further, the display 320 may be a component of a smart phone, a personal digital assistant, a television, a table computer, a notebook (laptop) computer, a personal computer, a vehicle dashboard, or the like.

In certain embodiments, the display 320 includes one or more speakers for producing sound. For example, the display 320 may produce an audible alert or notification (e.g., a beep or chime). In some embodiments, the display 320 includes one or more haptic devices for producing vibrations, motion, or other haptic feedback. In some embodiments, all or portions of the display 320 may be integrated with the input device 315. For example, the input device 315 and display 320 may form a touchscreen or similar touch-sensitive display. In other embodiments, the display 320 may be located near the input device 315.

The transceiver 325 communicates with a mobile communication network via a base unit 110 (e.g., via the source gNB 210 and/or target gNB 215). The transceiver 325 operates under the control of the processor 305 to transmit messages, data, and other signals and also to receive messages, data, and other signals. For example, the processor 305 may selectively activate the transceiver 325 (or portions thereof) at particular times in order to send and receive messages. The transceiver 325 may include one or more transmitters 330 and one or more receivers 335 for communicating with the base unit 110. As discussed above, the transceiver 325 may support one or more the network interfaces 340 for communicating with the mobile communication network.

Figure 4:
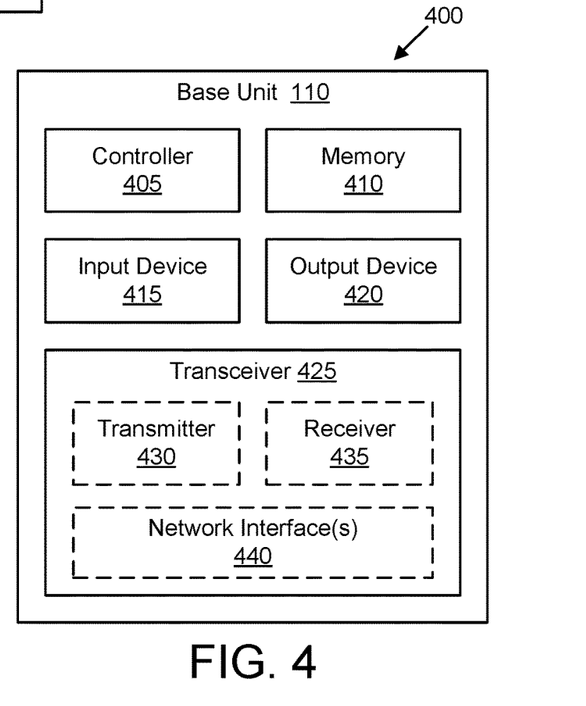
FIG. 4 is a schematic block diagram illustrating one embodiment of a base apparatus for indicating status of transmitted data to a target base unit.

FIG. 4 depicts one embodiment of a base station apparatus 400 that may be used for indicating status of transmitted data to a target base unit, according to embodiments of the disclosure. The base station apparatus 400 includes one embodiment of the base unit 110. Furthermore, the base unit 110 may include a processor 405, a memory 410, an input device 415, a display 420, and a transceiver 425. In some embodiments, the input device 415 and the display 420 are combined into a single device, such as a touchscreen. In certain embodiments, the base unit 110 may not include any input device 415 and/or display 420.

The transceiver 425 communicates with a mobile communication network (e.g., the mobile core network 130 and/or the core network 220) and with at least one remote unit 105 (e.g., the UE 205). As depicted, the transceiver 425 includes at least one transmitter 430 and at least one receiver 435. Additionally, the transceiver 425 may support at least one network interface 440, such as an "Uu" interface used for communications between the remote unit 105 and the base station apparatus 400, a "N2" interface used for communication with the AMF 225 (or AMF 135), and a "N3" interface used for communication with the UPF 230 (or UPF 140), or their equivalents. Additionally, the transceiver 425 may support a network interface, such as an "Xn" interface used for communication with another base unit.

The processor 405, in one embodiment, may include any known controller capable of executing computer-readable instructions and/or capable of performing logical operations. For example, the processor 405 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 405 executes instructions stored in the memory 410 to perform the methods and routines described herein. The processor 405 is communicatively coupled to the memory 410, the input device 415, the display 420, and the transceiver 425.

In some embodiments, the processor 405 determines to handover a remote unit to a target base unit (e.g., handing over the UE 205 to the target gNB 215). The processor 405 forwards (downlink) data belonging the remote unit to the target base unit while also transmitting the forwarded data to the remote unit. Thus, the downlink data is duplicated with one copy being forwarded to the target base unit and the other copy being transmitted to the remote unit. Here, the processor 405 forward the downlink data (and transmits a copy to the remote unit) until handover of the remote unit is completed. Additionally, the processor 405 sends a status message to the target base unit, the status message indicating whether the forwarded data was successfully transmitted to the remote unit. As used herein, data is considered successfully transmitted to the remote unit when transmission occurs and a positive acknowledgement ("ACK") is received from the remote unit.

In certain embodiments, when determining to handover the remote unit to a target base unit includes the processor 405 determines to perform a conditional handover of the remote unit. Accordingly, the processor 405 sends a condition for handover to the remote unit. While the condition for handover is not met, the remote unit remains connected to the base station apparatus 400. Consequently, the processor 405 forwards data for the remote unit to the target base unit and transmits the forwarded data to the remote unit in response to the condition for handover not being met. Once the condition for handover is met, the remote unit completes handover to the target base unit.

In some embodiments, the processor 405 identifies data units (e.g., PDCP SDU's) transmitted to the remote unit for which successful delivery was not acknowledged at the time the handover command is sent to the remote unit. In response to sending the handover command, the processor 405 sends a SN (sequence number) status message to the target base unit and forwards the aforementioned unacknowledged data units.

In certain embodiments, when forwarding data for the remote unit to the target base unit the processor 405 forwards a plurality of PDCP SDUs to the target base unit. Here, the status message may include a bitmap indicating a delivery status of each the forwarded plurality of PDCP SDUs. In this manner, a single status message may provide statuses of multiple PDCP SDUs.

In one embodiment, the processor 405 receives a RLC status report message from the remote unit. Here, the RLC status report message provides status information for one or more RLC PDUs. In response to receiving the RLC status report message, the processor 405 sends the status message to the target base unit.

In certain embodiments, sending a status message to the target base unit includes periodically sending a status message. In further embodiments, sending a status message periodically to the target base unit ends in response to ceasing transmitting the forwarded data for the remote unit.

In some embodiments, the processor 405 receives uplink data from the remote unit and forwards the uplink data to the target base unit. Here, the uplink data may include at least one uplink PDCP SDU. In one embodiment, the processor 405 sends an end marker to the target base unit in response to completing the forwarding of the at least one uplink PDCP SDU to the target base unit (e.g., in response to the remote unit completing handover to the target base unit). Here, the target base unit generates a PDCP status report in response to receiving the end marker and transmits the PDCP status report to the remote unit. In certain embodiments, forwarding the uplink data to the target base unit includes the processor 405 determining whether the uplink data is in-sequence, delivering the uplink data to a core network in response to the uplink data being in-sequence, and forwarding the uplink data to the target base unit is response to the uplink data not being in-sequence.

The memory 410, in one embodiment, is a computer readable storage medium. In some embodiments, the memory 410 includes volatile computer storage media. For example, the memory 410 may include a RAM, including dynamic RAM ("DRAM"), synchronous dynamic RAM ("SDRAM"), and/or static RAM ("SRAM"). In some embodiments, the memory 410 includes non-volatile computer storage media. For example, the memory 410 may include a hard disk drive, a flash memory, or any other suitable non-volatile computer storage device. In some embodiments, the memory 410 includes both volatile and non-volatile computer storage media. In some embodiments, the memory 410 stores data relating to indicating status of transmitted data to a target base unit, for example buffering data, storing network addresses belonging to a remote unit, protocol stacks, messages, security keys, remote unit context, and the like. In certain embodiments, the memory 410 also stores program code and related data, such as an operating system or other controller algorithms operating on the base station apparatus 400 and one or more software applications.

The input device 415, in one embodiment, may include any known computer input device including a touch panel, a button, a keyboard, a stylus, a microphone, or the like. In some embodiments, the input device 415 may be integrated with the display 420, for example, as a touchscreen or similar touch-sensitive display. In some embodiments, the input device 415 includes a touchscreen such that text may be input using a virtual keyboard displayed on the touchscreen and/or by handwriting on the touchscreen. In some embodiments, the input device 415 includes two or more different devices, such as a keyboard and a touch panel.

The display 420, in one embodiment, may include any known electronically controllable display or display device. The display 420 may be designed to output visual, audible, and/or haptic signals. In some embodiments, the display 420 includes an electronic display capable of outputting visual data to a user. For example, the display 420 may include, but is not limited to, an LCD display, an LED display, an OLED display, a projector, or similar display device capable of outputting images, text, or the like to a user. As another, non-limiting, example, the display 420 may include a wearable display such as a smart watch, smart glasses, a heads-up display, or the like. Further, the display 420 may be a component of a smart phone, a personal digital assistant, a television, a table computer, a notebook (laptop) computer, a personal computer, a vehicle dashboard, or the like.

In certain embodiments, the display 420 includes one or more speakers for producing sound. For example, the display 420 may produce an audible alert or notification (e.g., a beep or chime). In some embodiments, the display 420 includes one or more haptic devices for producing vibrations, motion, or other haptic feedback. In some embodiments, all or portions of the display 420 may be integrated with the input device 415. For example, the input device 415 and display 420 may form a touchscreen or similar touch-sensitive display. In other embodiments, the display 420 may be located near the input device 415.

The transceiver 425 communicates with one or more network functions of a mobile communication network. The transceiver 425 operates under the control of the processor 405 to transmit messages, data, and other signals and also to receive messages, data, and other signals. For example, the processor 405 may selectively activate the transceiver (or portions thereof) at particular times in order to send and receive messages. The transceiver 425 may include one or more transmitters 430 and one or more receivers 435. As discussed above, the transceiver 425 may support one or more the network interface 440 for communicating with a remote unit 105 and/or another base unit 110 (e.g., a target base unit).

Figure 5:
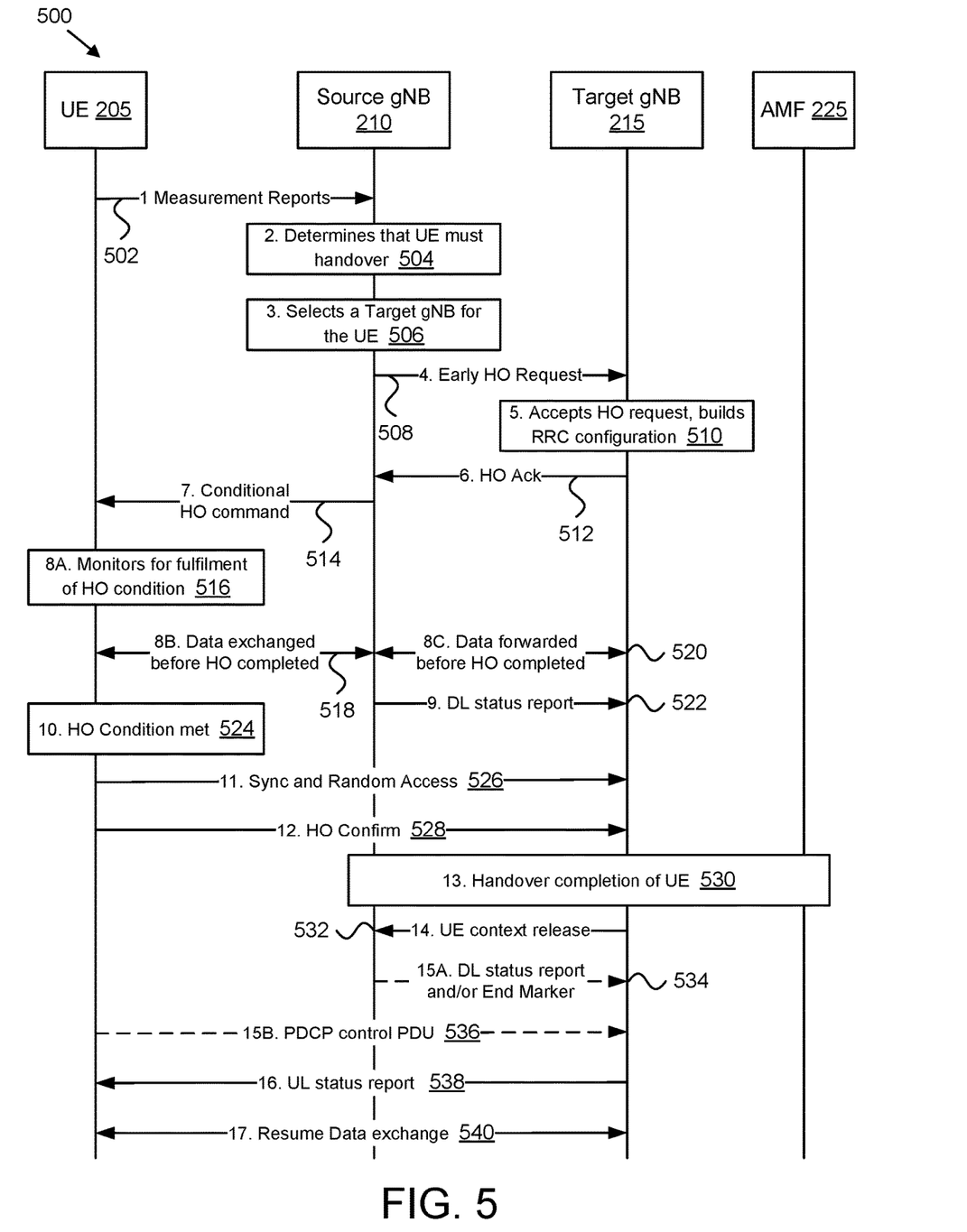
FIG. 5 is a block diagram illustrating one embodiment of a network procedure for indicating status of transmitted data to a target base unit.

FIG. 5 depicts a network procedure 500 for indicating status of transmitted data to a target base unit, according to embodiments of the disclosure. The network procedure 500 involves the UE 205, the source gNB 210, the target gNB 215, and the AMF 225 described above. The network procedure 500 begins as the UE 205 sends one or more measurement reports to the source gNB 210 (see messaging 502). In one embodiment, the UE 205 periodically sends measurement reports to the source gNB 210. In another embodiment, the UE 205 sends a measurement report in response to determining that signal conditions have deteriorated to a first threshold.

In response to a measurement report indicating that the first threshold is met, the source gNB 210 determines that the UE must handover to another gNB (see block 504). Here, first threshold may be selected such that the source gNB 210 is able to continue serving the UE 205 until signal conditions further deteriorate (e.g., until a second threshold is met). Having determined to handover the UE 205, the source gNB 210 selects a target gNB (here, the target gNB 215) for the UE (see block 506). The source gNB 210 also sends a handover request, such as the early handover request depicted here, to the target gNB 215 (see messaging 508).

The target gNB 215 determines whether it can accept handover of the UE 205. In the depicted embodiment, the target gNB 215 determines to accept the handover request (see block 510). Also, the target gNB 215 builds an RRC configuration for the UE 205 in preparation for the handover (see block 510). Additionally, the target gNB 215 communicates its acceptance by sending a handover acknowledgement message to the source gNB 210 (see messaging 512). In turn, the source gNB 210 sends a handover command to the UE 205 that identifies the target gNB 215. Here, the handover command is a conditional handover command that includes a condition for handover to be met before the UE 205 connects to the target gNB 215 (see messaging 514).

The conditional handover command triggers several actions by the UE 205 and source gNB 210. The UE 205 begins to monitor for fulfillment of the condition for handover (see block 516). Here, the UE continually (or periodically) monitors its signal conditions (e.g., monitors the values included in a measurement report) to determine whether current conditions meet the condition for handover. As noted earlier, the UE 205 may remain connected to the source gNB 210 for some considerable amount of time before the handover condition is met and it performs handover to the target gNB 215.

Source gNB 210 sends a SN (sequence number) status message to the target gNB 215 in response to having sent the handover command to the UE. Source gNB 210 forwards PDCP SDUs (together with their SNs) for which successful delivery was not acknowledged by the UE 205 at the time the handover command was sent to the UE 205.

Concurrently, the UE 205 and source gNB 210 exchange data before the handover is completed (see messaging 518). In one embodiment, the data is exchanged over the "Xn" interface. Here, the source gNB 210 may receive DL data for the UE 205 (e.g., from the UPF 140 and/or UPF 230) and transmit one or more data units (e.g., PDCP SDUs) corresponding to the DL data to the UE 205. The UE 205 provides feedback as to whether the data units are successfully received (e.g., by sending an ACK or NAK) to the source gNB 210. While the UE 205 remains connected to the source gNB 210, the source gNB 210 retransmits unsuccessfully received DL data units. In certain embodiments, the UE 205 has UL data to send, which it transmits to the source gNB 210. The source gNB 210, in turn, provides feedback as to whether it successfully received the UL data units and the UE 205 retransmits unsuccessfully received UL data units while connected to the source gNB 210.

Also concurrently, the source gNB 210 forwards data to the target gNB 215 before the handover is completed (see messaging 520). Here, the source gNB 210 forwards a copy of the DL data it receives for the UE to the target gNB 215. Thus, one copy is transmitted (e.g., over the radio interface) to the UE 205, while the other copy is forwarded to the target gNB 215. The target gNB 215 buffers this DL data in case it needs to retransmit it to the UE 205 once the UE 205 connects to the target gNB 215.

Further, the source gNB 210 forwards to the target gNB 215 UL data successfully received from the UE 205. In one embodiment, the source gNB 210 delivers the in-sequence received UL data units (e.g., PDCP SDUs) to the UPF 230 and forwards the out-of-sequence received UL data units (e.g., UL PDCP SDUs) to the target gNB 215 upon having sent to the HO command. In another embodiment, the source gNB 210 forwards every correctly received UL data unit (e.g., PDCP SDU) to the target gNB 215. This enables the target gNB 215 to generate a UL (PDCP) status report based on the forwarded uplink data 250 and sends the report to the UE 205 after handover completes.

In response to transmitting DL data to the UE 205 after the handover command, the source gNB 210 compiles and sends a DL status report to the target gNB 215 (see messaging 522). Here, the status report may be sent over the "Xn" interface. The status report includes SN information and ACK/NAK status for the DL data units (e.g., PDCP SDUs) transmitted to the UE 205. Note that the source gNB 210 is forwarding copies of the DL data units to the target gNB 215. Thus, the DL status reports keep the target gNB 215 up-to-date with the delivery status of the DL data it is buffering for the UE 205. Here, the target gNB 215 may remove from the buffer those DL data units successfully received at the UE 205 (as indicated by the status report). In one embodiment, the source gNB 210 sends a PDCP status report in response to receiving a RLC status report from the UE 205. In another embodiment, the source gNB 210 sends the (e.g., PDCP) status report periodically.

Items 516-522 all occur between the time when the handover command is sent/received and when the UE 205 connects to the target gNB 215 (e.g., due to the handover condition being met). At some point in time, the UE 205 determines that the condition for handover has been met (see block 524). In response, the UE 205 triggers handover to the target gNB 215. Here, the UE 205 performs synchronization and random access procedures with the target gNB 215 (see messaging 526). Upon successfully connecting to (e.g., accessing) the target gNB 215, the UE 205 sends a handover confirmation message (see messaging 528) and the target gNB 215 completes handover of the UE 205 with the AMF 225 (see block 530). In response, the target gNB 215 sends a UE context release message to the source gNB 210 (see messaging 532).

In certain embodiments, the source gNB 210 optionally sends a final DL status report in response to discovering that the UE 205 has handed over to the target gNB 215 (see messaging 534). Also, the source gNB 210 may send an end marker to the target gNB 215 (e.g., to signal an end of forwarding UL data to the target gNB 215).

In certain embodiments, the UE 205 optionally sends a PDCP status report to the target gNB 215 upon completing the handover. Here, the PDCP status report may be included in a PDCP control PDU (see messaging 536). In one embodiment, the PDCP status report indicates status information for multiple DRBs. To avoid delay of the PDCP status report, the UE 205 may prioritize the PDCP status report when first connecting to the target gNB 215, regardless of a general priority of a logical channel used to send PDCP reports. For example, the UE 205 may override logical channel priority levels to ensure that the PDCP control PDU is sent in the first uplink transmission to the target gNB 215. The PDCP status report may be sent using a MAC control element and/or an RRC information element, as discussed above.

In response to the UE 205 completing handover to the target gNB 215, the target gNB 215 may send a UL status report to the UE (see messaging 538). Here, the UL status report informs the UE 205 of the status (ACK/NAK) of the UL data units sent after the handover command, but while the UE 205 was still connected to the source gNB 210. Afterwards, the UE 205 and target gNB 215 resume data exchange. Here, unacknowledged UL and/or DL data may be retransmitted and new data exchanged.

Figure 6:
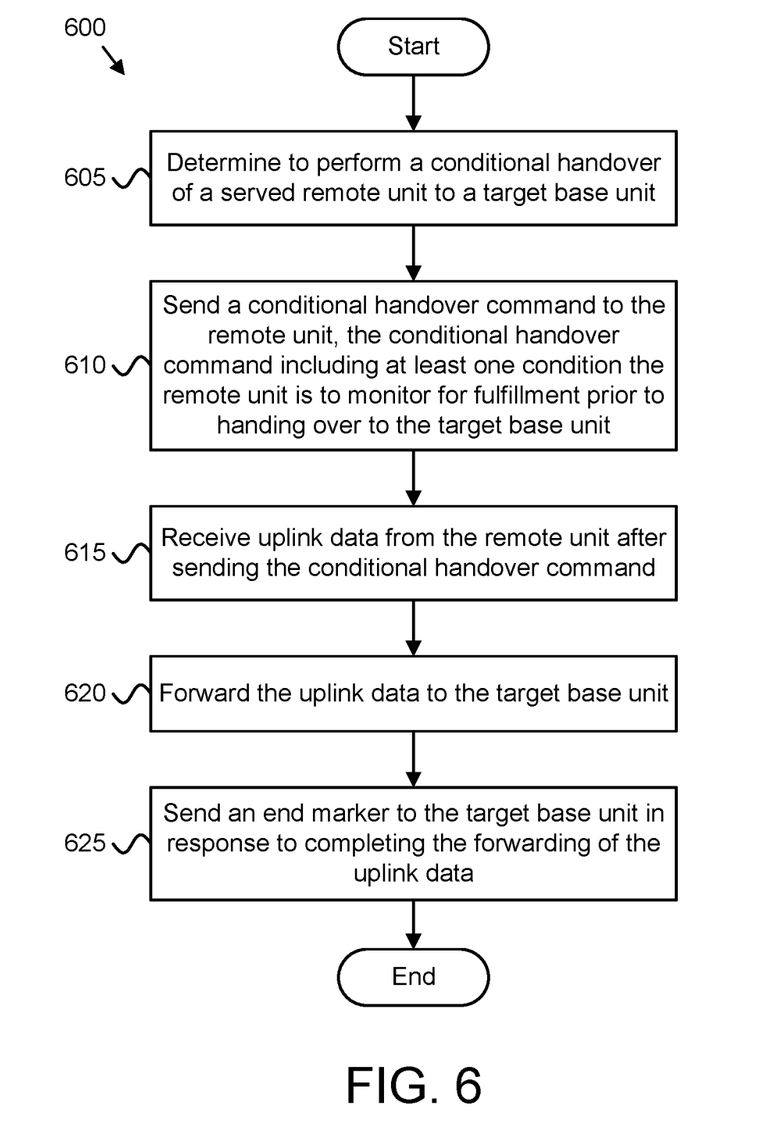
FIG. 6 is a schematic flow chart diagram illustrating one embodiment of a method for indicating status of transmitted data to a target base unit.

FIG. 6 depicts a method 600 for indicating status of transmitted data to a target base unit, according to embodiments of the disclosure. In some embodiments, the method 600 is performed by a base unit, such as the base unit 110, the source gNB 210, and/or the base station apparatus 400. In certain embodiments, the method 600 may be performed by a processor executing program code, for example, a microcontroller, a microprocessor, a CPU, a GPU, an auxiliary processing unit, a FPGA, or the like.

The method 600 begins and includes determining 605 to perform a conditional handover of a served remote unit to a target base unit. The method 600 includes sending 610 a conditional handover command to the remote unit, the conditional handover command including at least one condition the remote unit is to monitor for fulfillment prior to handing over to the target base unit.

The method 600 includes receiving 615 uplink data from the remote unit after sending the conditional handover command. The method 600 includes forwarding 620 the uplink data to the target base unit. The method 600 includes sending 625 an end marker to the target base unit in response to completing the forwarding of the uplink data. The method 600 ends.

Figure 7:
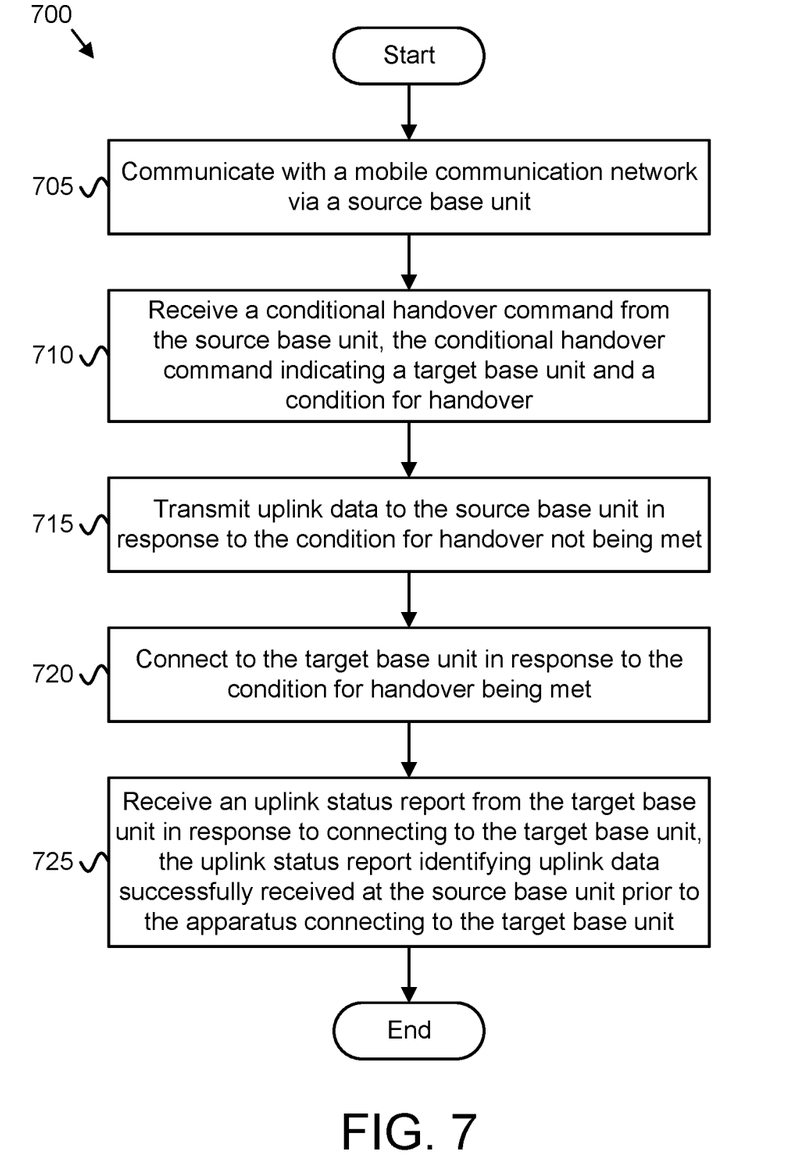
FIG. 7 is a schematic flow chart diagram illustrating another embodiment of a method for indicating status of transmitted data to a target base unit.

FIG. 7 depicts a method 700 for indicating status of transmitted data to a target base unit, according to embodiments of the disclosure. In some embodiments, the method 700 is performed by a UE, such as the remote unit 105, UE 205, or remote apparatus 300. In certain embodiments, the method 700 may be performed by a processor executing program code, for example, a microcontroller, a microprocessor, a CPU, a GPU, an auxiliary processing unit, a FPGA, or the like.

The method 700 begins and includes communicating 705 with a mobile communication network via a source base unit. The method 700 includes receiving 710 a conditional handover command from the source base unit, the conditional handover command indicating a target base unit and a condition for handover. The method 700 includes transmitting 715 uplink data to the source base unit in response to the condition for handover not being met.

The method 700 includes connecting 720 to the target base unit in response to the condition for handover being met. The method 700 includes receiving 725 an uplink status report from the target base unit in response to connecting to the target base unit, the uplink status report identifying uplink data successfully received at the source base unit prior to the apparatus connecting to the target base unit. The method 700 ends.

Disclosed herein is a first apparatus for indicating the status of forwarded data, according to embodiments of the disclosure. The first apparatus may be implemented by a RAN node, such as the base unit 110, the source gNB 210, and/or the base station apparatus 400. The first apparatus includes a processor and a transceiver that communicates with a remote unit. The processor determines to perform a conditional handover of the remote unit to a target base unit and sends a conditional handover command to the remote unit, the conditional handover command including at least one condition the remote unit is to monitor for fulfillment prior to handing over to the target base unit. The processor receives uplink data from the remote unit after sending the conditional handover command and forwards the uplink data to the target base unit. The processor also sends an end marker to the target base unit in response to completing the forwarding of the uplink data.

In some embodiments, the uplink data includes at least one uplink PDCP SDU. In such embodiments, the processor sends the end marker to the target base unit in response to completing the forwarding of the at least one uplink PDCP SDU to the target base unit.

In certain embodiments, forwarding the uplink data to the target base unit includes the processor determining whether the uplink data is in-sequence and either delivering the uplink data to a core network in response to the uplink data being in-sequence or forwarding the uplink data to the target base unit is response to the uplink data not being in-sequence.

In various embodiments, the processor receives downlink data from a core network. In such embodiments, the processor forwards the downlink data for the remote unit to the target base unit in response to sending the conditional handover command and transmits a copy of the downlink data to the remote unit in response to sending the conditional handover command. The processor may also send a status message to the target base unit, the status message indicating which of the forwarded downlink data was successfully transmitted to the remote unit.

In certain embodiments, forwarding data for the remote unit to the target base unit includes forwarding a plurality of PDCP SDUs to the target base unit, wherein the status message includes a bitmap indicating a delivery status of each the forwarded plurality of PDCP SDUs.

In certain embodiments, transmitting the copy of the forwarded data to the remote unit occurs in response to the condition for handover not being met. In certain embodiments, sending a status message to the target base unit includes periodically sending a status message. In one embodiment, sending a status message periodically to the target base unit ends in response to ceasing transmitting the forwarded data for the remote unit.

In certain embodiments, the processor further receives a RLC status report message from the remote unit, wherein the processor sends the status message to the target base unit in response to receiving the RLC status report message from the remote unit.

Disclosed herein is a first method for indicating the status of forwarded data, according to embodiments of the disclosure. The first method may be performed by a RAN node, such as the base unit 110, the source gNB 210, and/or the base station apparatus 400. The first method includes determining to perform a conditional handover of a served remote unit to a target base unit and sending a conditional handover command to the remote unit, the conditional handover command including at least one condition the remote unit is to monitor for fulfillment prior to handing over to the target base unit. The first method includes receiving uplink data from the remote unit after sending the conditional handover command and forwarding the uplink data to the target base unit. The first method includes sending an end marker to the target base unit in response to completing the forwarding of the uplink data.

In some embodiments of the first method, the uplink data includes at least one uplink PDCP SDU. In such embodiments, sending the end marker to the target base unit occurs in response to completing the forwarding of the at least one uplink PDCP SDU to the target base unit.

In certain embodiments of the first method, forwarding the uplink data to the target base unit includes determining whether the uplink data is in-sequence and either delivering the uplink data to a core network in response to the uplink data being in-sequence or forwarding the uplink data to the target base unit is response to the uplink data not being in-sequence.

In various embodiments, the first method includes receiving downlink data from a core network. In such embodiments, the first method further includes forwarding the downlink data for the remote unit to the target base unit in response to sending the conditional handover command and transmitting a copy of the downlink data to the remote unit in response to sending the conditional handover command. The first method may also include sending a status message to the target base unit, the status message indicating which of the forwarded downlink data was successfully transmitted to the remote unit.

In certain embodiments of the first method, forwarding data for the remote unit to the target base unit includes forwarding a plurality of PDCP SDUs to the target base unit, wherein the status message includes a bitmap indicating a delivery status of each the forwarded plurality of PDCP SDUs.

In certain embodiments of the first method, transmitting the copy of the forwarded data to the remote unit occurs in response to the condition for handover not being met. In certain embodiments of the first method, sending a status message to the target base unit includes periodically sending a status message. In one embodiment, sending a status message periodically to the target base unit stop in response to ceasing transmitting the forwarded data for the remote unit.

In some embodiments, the first method further includes receiving a RLC status report message from the remote unit, wherein the status message is sent to the target base unit in response to receiving the RLC status report message from the remote unit.

Disclosed herein is a second apparatus for indicating the status of forwarded data. The second apparatus may be implemented by a UE device, such as the such as the remote unit 105, UE 205, or remote apparatus 300. The second apparatus includes a processor and a transceiver that communicates with a mobile communication network via a source base unit. The processor receives a conditional handover command from the source base unit—the conditional handover command indicating a target base unit and a condition for handover—and transmits uplink data to the source base unit in response to the condition for handover not being met. The processor connects to the target base unit in response to the condition for handover being met and receives an uplink status report from the target base unit in response to connecting to the target base unit, the uplink status report identifying uplink data successfully received at the source base unit prior to the apparatus connecting to the target base unit.

In some embodiments, the processor identifies at least one unsuccessfully received uplink packet data convergence protocol ("PDCP") service data unit ("SDU") from the uplink status report and retransmits the at least one unsuccessfully received uplink PDCP SDU to the target base unit.

In various embodiments, the processor further receives downlink data from the source base unit in response to the condition for handover not being met and transmits a downlink status report to the target base unit in response to connecting to the target base unit, the downlink status report identifying downlink data successfully received from the source base unit prior to connecting to the target base unit. In such embodiments, transmitting the downlink status report comprises transmitting a PDCP control PDU in a first uplink transmission to the target base unit. In certain embodiments, transmitting the downlink status report comprises transmitting a PDCP status report using the PDCP control PDU.

In certain embodiments, the downlink status report comprises a MAC control element, wherein transmitting the downlink status report comprises generating a status report indicating a PDCP status of one or more DRBs. In one embodiment, the MAC control element comprises an identifier for each of the one or more DRBs. In certain embodiments, the downlink status report comprises a RRC information element, wherein transmitting the downlink status report comprises generating a downlink status report indicating a downlink PDCP status of one or more DRBs.

Disclosed herein is a second method for indicating the status of forwarded data. The second method may be performed by a UE device, such as the such as the remote unit 105, UE 205, or remote apparatus 300. The second method includes receiving a conditional handover command from the source base unit, the conditional handover command indicating a target base unit and a condition for handover, and transmitting uplink data to the source base unit in response to the condition for handover not being met. The second method includes connecting to the target base unit in response to the condition for handover being met and receiving an uplink status report from the target base unit in response to connecting to the target base unit, the uplink status report identifying uplink data successfully received at the source base unit prior to the apparatus connecting to the target base unit.

In some embodiments, the second method includes identifying at least one unsuccessfully received uplink packet data convergence protocol ("PDCP") service data unit ("SDU") from the uplink status report and retransmitting the at least one unsuccessfully received uplink PDCP SDU to the target base unit.

In various embodiments, the second method further includes receiving downlink data from the source base unit in response to the condition for handover not being met and transmitting a downlink status report to the target base unit in response to connecting to the target base unit, the downlink status report identifying downlink data successfully received from the source base unit prior to connecting to the target base unit. In such embodiments, transmitting the downlink status report comprises transmitting a PDCP control PDU in a first uplink transmission to the target base unit. In certain embodiments, transmitting the downlink status report comprises transmitting a PDCP status report using the PDCP control PDU.

In certain embodiments of the second method, the downlink status report comprises a MAC control element, wherein transmitting the downlink status report comprises generating a status report indicating a PDCP status of one or more DRBs. In one embodiment, the MAC control element comprises an identifier for each of the one or more DRBs. In certain embodiments of the second method, the downlink status report comprises an RRC information element, wherein transmitting the downlink status report comprises generating a downlink status report indicating a downlink PDCP status of one or more DRBs.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
a transceiver that communicates with a remote unit;
a processor that:
determines to perform a conditional handover of the remote unit to a target base unit;
sends a conditional handover command to the remote unit, the conditional handover command including at least one condition the remote unit is to monitor for fulfillment prior to handing over to the target base unit;
receives uplink data from the remote unit after sending the conditional handover command, wherein the uplink data comprises both in-sequence uplink data units and out-of-sequence uplink data units;
receives a radio link control ("RLC") status report message from the remote unit;
forwards contents of the RLC status report message to the target base unit;
forwards the in-sequence uplink data units and the out-of-sequence uplink data units to the target base unit; and
sends an end marker to the target base unit in response to completing the forwarding of the in-sequence uplink data units and the out-of-sequence uplink data units.

2. The apparatus of claim 1, wherein the uplink data comprises at least one uplink packet data convergence protocol ("PDCP") service data unit ("SDU"), wherein the processor sends the end marker to the target base unit in response to completing the forwarding of the at least one uplink PDCP SDU to the target base unit.

3. The apparatus of claim 1, wherein each received uplink data unit is associated with a sequence number, wherein forwarding the uplink data to the target base unit comprises the processor:
determining whether a received uplink data unit is in-sequence based on the associated sequence number.

4. The apparatus of claim 1, wherein the processor further:
receives downlink data from a core network;
forwards the downlink data for the remote unit to the target base unit in response to sending the conditional handover command;
transmits a copy of the downlink data to the remote unit in response to sending the conditional handover command; and
sends a status message to the target base unit, the status message indicating which of the forwarded downlink data was successfully transmitted to the remote unit.

5. The apparatus of claim 4, wherein forwarding data for the remote unit to the target base unit comprises forwarding a plurality of packet data convergence protocol ("PDCP") service data units ("SDUs") to the target base unit, wherein the status message includes a bitmap indicating a delivery status of each the forwarded plurality of PDCP SDUs.

6. The apparatus of claim 4, wherein transmitting the copy of the forwarded data to the remote unit occurs in response to the condition for handover not being met.

7. The apparatus of claim 4, wherein sending a status message to the target base unit comprises periodically sending a status message.

8. The apparatus of claim 7, wherein sending a status message periodically to the target base unit ends in response to ceasing transmitting the forwarded data for the remote unit.

9. The apparatus of claim 1, wherein the RLC status report message indicates downlink data that was successfully transmitted to the remote unit.

10. A method comprising:
determining to perform a conditional handover of a served remote unit to a target base unit;
sending a conditional handover command to the remote unit, the conditional handover command including at least one condition the remote unit is to monitor for fulfillment prior to handing over to the target base unit;
receiving uplink data from the remote unit after sending the conditional handover command, wherein the uplink data comprises both in-sequence uplink data units and out-of-sequence uplink data units;
receiving a radio link control ("RLC") status report message from the remote unit;
forwarding contents of the RCL status report message to the target base unit in response to receiving the RLC status report message from the remote unit;
forwarding the in-sequence uplink data units and the out-of-sequence uplink data units to the target base unit; and
sending an end marker to the target base unit in response to completing the forwarding of the in-sequence uplink data units and the out-of-sequence uplink data units.

11. The method of claim 10, wherein the uplink data comprises at least one uplink packet data convergence protocol ("PDCP") service data unit ("SDU"), wherein sending the end marker to the target base unit occurs in response to completing the forwarding of the at least one uplink PDCP SDU to the target base unit.

12. The method of claim 10, wherein each received uplink data unit is associated with a sequence number, wherein forwarding the uplink data to the target base unit comprises:
determining whether a received uplink data unit is in-sequence based on the associated sequence number.

13. The method of claim 10, further comprising:
receiving downlink data from a core network;
forwarding the downlink data for the remote unit to the target base unit in response to sending the conditional handover command;
transmitting a copy of the downlink data to the remote unit in response to sending the conditional handover command; and
sending a status message to the target base unit, the status message indicating which of the forwarded downlink data was successfully transmitted to the remote unit.

14. The method of claim 13, wherein forwarding data for the remote unit to the target base unit comprises forwarding a plurality of packet data convergence protocol ("PDCP") service data units ("SDUs") to the target base unit, wherein the status message includes a bitmap indicating a delivery status of each the forwarded plurality of PDCP SDUs.

15. The method of claim 13, wherein transmitting the copy of the forwarded data to the remote unit occurs in response to the condition for handover not being met.

16. The method of claim 13, wherein sending a status message to the target base unit comprises periodically sending a status message.

17. The method of claim 16, wherein sending a status message periodically to the target base unit ends in response to ceasing transmitting the forwarded data for the remote unit.

18. The method of claim 10, wherein the RLC status report message indicates downlink data that was successfully transmitted to the remote unit.

19. An apparatus comprising:
a transceiver that communicates with a mobile communication network via a source base unit; and
a processor that:
receives a conditional handover command from the source base unit, the conditional handover command indicating a target base unit and a condition for handover;
transmits uplink data to the source base unit in response to the condition for handover not being met;
connects to the target base unit in response to the condition for handover being met; and
receives an uplink status report from the target base unit in response to connecting to the target base unit, the uplink status report identifying uplink data successfully received at the source base unit prior to the apparatus connecting to the target base unit.

20. The apparatus of claim 19, wherein the processor further:
identifies at least one unsuccessfully received uplink packet data convergence protocol ("PDCP") service data unit ("SDU") from the uplink status report; and
retransmits the at least one unsuccessfully received uplink PDCP SDU to the target base unit.

* * * * *